United States Patent
Weber et al.

(10) Patent No.: US 9,172,074 B2
(45) Date of Patent: Oct. 27, 2015

(54) NONWOVEN MATERIAL WITH PARTICLE FILLER

(75) Inventors: Christoph Weber, Laudenbach (DE); Michael Roth, Mainz (DE); Peter Kritzer, Forst (DE); Gunter Scharfenberger, Frankenthal (DE); Rudolf Wagner, Muellheim (DE)

(73) Assignee: CARL FREUDENBERG KG, Weinheim (DE)

( * ) Notice: Subject to any disclaimer, the term of this patent is extended or adjusted under 35 U.S.C. 154(b) by 439 days.

(21) Appl. No.: 12/677,008

(22) PCT Filed: Sep. 8, 2008

(86) PCT No.: PCT/EP2008/007334
§ 371 (c)(1),
(2), (4) Date: Mar. 8, 2010

(87) PCT Pub. No.: WO2009/033627
PCT Pub. Date: Mar. 19, 2009

(65) Prior Publication Data
US 2010/0206804 A1    Aug. 19, 2010

(30) Foreign Application Priority Data

Sep. 7, 2007 (DE) .......................... 10 2007 042 554
Jan. 25, 2008 (EP) ..................................... 08001406

(51) Int. Cl.
*H01M 2/16* (2006.01)
*H01M 8/10* (2006.01)

(52) U.S. Cl.
CPC ............ *H01M 2/1653* (2013.01); *H01M 2/162* (2013.01); *H01M 2008/1095* (2013.01);
(Continued)

(58) Field of Classification Search
CPC ............. H01M 2/1653; H01M 2/162; H01M 2008/01095; Y10S 428/25; Y10S 425/119; Y10T 442/699; Y10T 442/20; Y10T 442/2008; Y10T 442/2885; Y10T 442/2893; Y10T 442/291; Y10T 442/2918
USPC ................................ 428/317.9; 442/375, 417
See application file for complete search history.

(56) References Cited

U.S. PATENT DOCUMENTS

| | | |
|---|---|---|
| 3,022,366 A | 2/1962 | Kilroy |
| 4,180,611 A | 12/1979 | Schmidt et al. |

(Continued)

FOREIGN PATENT DOCUMENTS

| | | |
|---|---|---|
| CH | 451492 A | 5/1968 |
| CN | 1331843 A | 1/2002 |

(Continued)

OTHER PUBLICATIONS

International Search Report mailed on Jan. 16, 2009, which issued during the prosecution of International Patent Application No. PCT/EP2008/007334; 3 pages.

(Continued)

*Primary Examiner* — Jeremy R Pierce
(74) *Attorney, Agent, or Firm* — Leydig, Voit & Mayer, Ltd.

(57) ABSTRACT

A ply includes a fibrous nonwoven web fabric forming a foundational structure, wherein the foundational structure includes fibers forming first pores and is partially filled with particles, wherein the particles at least partially fill the first pores so as to form regions filled with particles, wherein the particles in the filled regions form second pores, and wherein an average diameter of the particles is greater than an average pore size of more than 50% of the second pores.

24 Claims, 3 Drawing Sheets

(52) U.S. Cl.
CPC .......... *Y10T442/20* (2015.04); *Y10T 442/2008* (2015.04); *Y10T 442/2885* (2015.04); *Y10T 442/2893* (2015.04); *Y10T 442/291* (2015.04); *Y10T 442/2918* (2015.04)

(56) References Cited

U.S. PATENT DOCUMENTS

| | | | |
|---|---|---|---|
| 4,983,450 | A | 1/1991 | Yanagihara et al. |
| 5,328,758 | A | 7/1994 | Markell et al. |
| 5,747,110 | A | 5/1998 | Tallentire et al. |
| 5,800,947 | A * | 9/1998 | Kohler et al. ............. 429/223 |
| 5,882,721 | A * | 3/1999 | Delnick .................... 427/77 |
| 6,632,561 | B1 | 10/2003 | Bauer et al. |
| 6,746,803 | B1 | 6/2004 | Bauer et al. |
| 7,662,517 | B2 | 2/2010 | Lee et al. |
| 2002/0168569 | A1 | 11/2002 | Barriere et al. |
| 2002/0180088 | A1* | 12/2002 | Hashiguchi et al. ........ 264/102 |
| 2003/0064282 | A1 | 4/2003 | Nakagawa et al. |
| 2004/0202835 | A1 | 10/2004 | Gronroos |
| 2005/0032451 | A1 | 2/2005 | Kritzer et al. |
| 2005/0158630 | A1 | 7/2005 | Lambert |
| 2005/0208383 | A1 | 9/2005 | Totsuka et al. |
| 2005/0221165 | A1 | 10/2005 | Hennige et al. |
| 2006/0008700 | A1 | 1/2006 | Yong et al. |
| 2006/0024569 | A1 | 2/2006 | Hennige et al. |
| 2006/0078722 | A1 | 4/2006 | Noumi et al. |
| 2006/0151742 | A1* | 7/2006 | Hegi .................... 252/299.01 |
| 2007/0122716 | A1 | 5/2007 | Seo et al. |
| 2007/0139860 | A1 | 6/2007 | Hoerpel et al. |
| 2007/0207693 | A1 | 9/2007 | Tsukuda et al. |
| 2007/0264577 | A1 | 11/2007 | Katayama et al. |
| 2008/0070107 | A1* | 3/2008 | Kasamatsu et al. ........... 429/144 |
| 2008/0138700 | A1 | 6/2008 | Horpel et al. |
| 2008/0245735 | A1 | 10/2008 | Hennige et al. |
| 2009/0311418 | A1 | 12/2009 | Hennige et al. |
| 2009/0311589 | A1 | 12/2009 | Kim et al. |
| 2010/0196688 | A1 | 8/2010 | Kritzer et al. |

FOREIGN PATENT DOCUMENTS

| | | |
|---|---|---|
| CN | 1670989 A | 9/2005 |
| CN | 1679183 A | 10/2005 |
| DE | 3125751 A1 | 3/1982 |
| DE | 3605981 A1 | 8/1987 |
| DE | 19850826 A1 | 5/2000 |
| DE | 10238944 A1 | 3/2004 |
| DE | 10238945 A1 | 3/2004 |
| DE | 10336380 A1 | 3/2005 |
| DE | 10347568 A1 | 5/2005 |
| EP | 0892448 A2 | 1/1999 |
| EP | 1138092 B1 | 9/2002 |
| EP | 1271673 A1 | 1/2003 |
| EP | 1724395 A1 | 11/2006 |
| EP | 1490550 B1 | 1/2008 |
| EP | 1965454 A1 | 9/2008 |
| GB | 1148852 B | 4/1969 |
| GB | 2078769 A | 1/1982 |
| JP | 57044969 A | 3/1982 |
| JP | 63503074 A | 11/1988 |
| JP | 08185847 A | 7/1996 |
| JP | 2002529891 A | 5/2000 |
| JP | 2005268096 A | 9/2005 |
| JP | 2008210791 A | 9/2008 |
| RU | 2074457 C1 | 2/1997 |
| WO | WO 8706395 A1 | 10/1987 |
| WO | WO 9835738 A1 | 8/1998 |
| WO | 0024075 A1 | 4/2000 |
| WO | WO 0062355 A1 | 10/2000 |
| WO | 2004021475 A1 | 3/2004 |
| WO | 2005038959 A1 | 4/2005 |
| WO | 2005104269 A1 | 11/2005 |
| WO | 2006/062153 A1 | 6/2006 |
| WO | 2006068428 A1 | 6/2006 |
| WO | 2007028662 A1 | 3/2007 |

OTHER PUBLICATIONS

European Patent Office, International Search Report in International Patent Application No. PCT/EP2008/007334 (Jan. 16, 2009).
George Odian, Principles of Polymerization, A Wiley-Interscience Publication, 1991, pp. 7, Third Edition, John Wiley & Sons, Inc., Staten Island, New York.
Roethemeyer et al., Kautschuktechnologie, Sep. 2001, pp. 3.
Thermoplastics & Thermosetting Polymers, http://www.transtutors.com/chemistry-homework-help/polymers/thermoplastics-and-thermosetting-polymers-difference.aspx (Mar. 21, 2013).
Japanese Office Action in JP 2010-547109; dated Mar. 24, 2012.

* cited by examiner

US 9,172,074 B2

NONWOVEN MATERIAL WITH PARTICLE FILLER

This is a U.S. National Phase Application under 35 U.S.C. §371 of International Application No. PCT/EP2008/007334, filed Sep. 8, 2008, which claims priority to German Application No. DE 10 2007 042 554.8, filed Sep. 7, 2007 and European Application No. EP 08001406.1, filed Jan. 25, 2008. The International Application was published in German on Mar. 19, 2009 as WO 2009/033627 under PCT Article 21 (2).

This invention relates to a ply having a foundational structure composed of a fibrous nonwoven web fabric, the foundational structure consisting of fibers and having first pores formed by the fibers, the foundational structure being at least partially filled with particles, which particles at least partially fill the first pores and form regions filled with particles.

BACKGROUND

Plies of the type mentioned are already known from the prior art. Such plies are used as separators in batteries and capacitors in energy storage duty. Charge storage in batteries and capacitors takes place chemically, physically or in a mixed form, for example by chemisorption.

To avoid an internal discharge within the battery or capacitor, oppositely charged electrodes are separated from each other mechanically by means of materials which do not conduct electrons and are known as separators or spacers. At the same time, by virtue of their porosity being conformed to the energy storage system and its use, the separators or spacers make it possible for ionic charge-carriers of an electrolyte to move between the electrodes.

The separators known from the prior art have small, interlinked openings in the micrometer range. These openings are said to be as large as possible in order that electrolyte conductivity in the drenched separator be as high as possible and the battery thus have a high power density. However, if the openings are too large, then metal dendrites can lead to a short circuit between the two electrodes which are actually to be electrically separated from each other. The metal dendrites consist either of lithium or of other metals which can be present in the battery as impurities.

Furthermore, particles of electrically conductive electrode materials can migrate through the openings. These processes can give rise to a short circuit between the electrodes and greatly speed the self-discharging of the battery or capacitor.

A short circuit can result in the local flow of very high currents, which releases heat. This heat can cause the separator to melt, which in turn can lead to a distinct decrease in the insulating/isolating effect of the separator. A very rapidly self-discharging battery consequently constitutes a high safety risk because of its high energy content and also the combustibility of the electrolyte and of other constituents.

A further disadvantage with separators known from the prior art is their lack of stability in the event of rising temperatures. The melting point is around 130° C. when polyethylene is used and around 150° C. when polypropylene is used.

Causes of short circuits include shrinkage of the separator due to excessive high temperature in the battery, metal dendrite growth due to reduction of metal ions (lithium, iron, manganese or other metallic impurities), debris from electrode particles, cutting debris or broken covering on electrodes, and direct contact between the two flat electrodes under pressure.

EP 0 892 448 A2 discloses the shutdown mechanism. The shutdown mechanism responds to local heating, for example due to a short circuit, by counteracting the aerial spreading of the short circuit by prohibiting ion migration in the vicinity of the initial short circuit. The heat loss due to the short circuit causes polyethylene to heat up to such an extent that it will melt and blind the pores of the separator. Polypropylene, which has a higher melting point, stays mechanically intact.

US 2002/0168569 A1 describes the construction of a separator consisting of polyvinyl difluoride which, in the manufacturing operation, is incipiently solubilized with a solvent, mixed with silica particles and applied as a thin film. Removing the solvent leaves a porous membrane.

WO 2006/068428 A1 describes the production of separators for lithium ion batteries by using a polyolefin separator which is additionally filled with gellike polymers and inorganic particles.

WO 2004/021475 A1 describes the use of ceramic particles which are combined with organosilicon adhesion promoters and inorganic binders from oxides of the elements silicon, aluminum and/or zirconium to form a thin sheet material.

To achieve adequate mechanical flexibility, the ceramic particles are incorporated into a supporting material, for example a fibrous nonwoven web fabric. This is disclosed by WO 2005/038959 A1.

To prevent short circuits in the initial stages of metal dendrite formation, WO 2005/104269 A1 describes the use of comparatively low-melting waxes as an admixture to a ceramic paste.

WO 2007/028662 A1 describes the addition of polymer particles having a melting point of above 100° C. to ceramic fillers in order that the mechanical properties of the separator may be improved. The materials described are intended for use as a separator for lithium ion materials. Although these separators do provide a higher thermal stability than membranes, they have so far not been a commercial success. This may be due to their relatively high costs and to the excessive thickness of the material, which is above 25 µm.

WO 2000/024075 A1 describes the production of a membrane which can be used in fuel cells. This membrane consists of glass fiber materials in which fluorinated hydrocarbon polymers are fixed by means of a silicate binder.

Finally, JP 2005268096 A describes a separator for lithium ion batteries which is produced by melting together thermoplastic particles in a polyethylene/polypropylene fibrous supporting material by heating. This separator has a bubble-shaped porous structure having a pore diameter of 0.1-15 µm.

The prior art does not show an inexpensive separator which combines low thickness with high porosity and high thermal stability and can be safely used, over a wide temperature range, in batteries having high power and energy density.

SUMMARY OF THE INVENTION

An aspect of the present invention is to develop and refine a ply of the type mentioned at the beginning such that it combine low thickness with high porosity and high thermal stability following inexpensive fabrication.

According to that, the ply is characterized in that the particles in the filled regions form second pores, the average diameter of the particles being greater than the average pore size of the majority of the second pores.

The frequency distribution of the average pore sizes is set according to the present invention such that more than 50% of the second pores have average pore sizes which are below the average diameter of the particles. The inventors recognized that the pore structure of an inexpensive fibrous nonwoven web fabric can be modified through suitable arrangement and selection of particles. Specifically, the porosity of the ply of the present invention was recognized to be enhanceable compared to polyolefin membranes without reducing its stability. The arrangement of a multiplicity of particles whose average diameter is greater than the average pore size of the majority of the second pores in the filled region makes it possible to develop a high porosity and hence an enhanced imbibition of electrolyte by the fibrous nonwoven web fabric. At the same time, the pore structure created makes it virtually impossible for harmful metal dendrites to form therein. The present invention provides an arrangement for the particles which engenders a pore structure which is not bubblelike but is labyrinthine and includes elongate pores. In such a pore structure, it is virtually impossible for dendritic growths to form that extend all the way from one side of the ply to the other. This is efficacious in preventing short circuits in batteries or capacitors. The ply of the present invention is therefore very useful as a separator for batteries and capacitors having high power and energy density. The ply of the present invention is safe to use over a wide temperature range.

The particles could be spherical. This may advantageously produce an overwhelmingly closest packing of spheres in the first pores in the fibrous nonwoven web fabric. The average pore size of the majority of the second pores is essentially determined by geometric conditions in the packings of spheres. There are an infinite number of ways to produce a closest packing of spheres. Their common feature is that they consist of hexagonal layers of spheres. The two most important representatives are the hexagonally closest packing of spheres (layer sequence A, B, A, B, A, B) and the cubically closest packing of spheres (layer sequence A, B, C, A, B, C, A). The cubically closest packing of spheres is also known as the face-centered cubic packing of spheres. Each sphere in a closest packing of spheres has 12 neighbors, six in its own layer and three each above and below. They form a cuboctahedron in the cubic arrangement and an anticuboctahedron in the hexagonal arrangement. The packing density of a closest packing of spheres is 74%. However, the desire is to produce as high a porosity as possible. Therefore, not all particles in the first pores of the fibrous nonwoven web fabric will form a closest packing of spheres. Rather, there will also be zones where the particles are packed loosely, which promotes high porosity.

In a further embodiment of the present invention, the particles are nonspherical, or there is a proportion of nonspherical particles. This embodiment relates particularly to the use of inorganic particles. These frequently have an irregular, fissured shape with corners and edges. Such particles can also be admixed to spherical particles, for example in a proportion of up to 10%, 20% or 50% by weight. In this way, the properties of the particles can be advantageously combined.

The particles could form a sheetlike homogeneous distribution in the foundational structure. This concrete form is a particularly effective way to prevent short circuits. Metal dendrites and detritus find it virtually impossible to migrate through a homogeneously covered sheet. Furthermore, such a sheet prevents direct contact between electrodes on application of pressure. It is specifically conceivable against this background that all the first pores in the fibrous nonwoven web fabric are homogeneously filled with the particles such that the ply predominantly exhibits average pore sizes which are smaller than the average diameters of the particles.

The foundational structure could have a coating of the particles. A coating likewise is an advantageous way of effecting the aforementioned prevention of short circuits. When a ply has a coating, the foundational structure will inevitably have a boundary region which is at least partly filled with particles.

The particles could be united with the fibrous nonwoven web fabric, or with each other, by a binder. This binder could consist of organic polymers. The use of a binder consisting of organic polymers makes it possible to produce a ply having sufficient mechanical flexibility. Polyvinylpyrrolidone surprisingly shows excellent binder properties.

In preferred embodiments of the present invention, the binder is a polyester, polyamide, polyether, polycarboxylates, a polycarboxylic acid, a polyvinyl compound, a polyolefin, a rubber, a halogenated polymer and/or an unsaturated polymer.

The binders could be used in the form of homopolymers or as copolymers. Useful copolymers include for example random copolymers, gradient copolymers, alternating copolymers, block copolymers or graft polymers. Copolymers can consist of two, three, four or more different monomers (terpolymers, tetrapolymers).

It could be preferable to use thermoplastic, elastomeric and/or thermosetting binders. Examples which may be mentioned against this background are polyvinylpyrrolidone, polyacrylic acid, polyacrylates, polymethacrylic acid, polymethacrylates, polystyrene, polyvinyl alcohol, polyvinyl acetate, polyacrylamide, polyvinylidene fluoride and copolymers of the aforementioned, cellulose and its derivatives, polyethers, phenolic resins, melamine resins, polyurethanes, nitrile rubber (NBR), styrene-butadiene rubber (SBR) and also latex.

In a preferred embodiment, the binder is an unsaturated polymer. The unsaturated groups may be for example carbon-carbon double or triple bonds or carbon-nitrogen double or triple bonds. Preference is given to C=C double bonds. These can be uniformly distributed in the polymer, as for example in the case of polymers obtainable by polymerization of dienes. Such polymers can also be partially hydrogenated. Alternatively, polymer foundational scaffolds can be coupled to radicals which contain unsaturated groups. Unsaturated polymers are generally notable for good adhering properties.

In a preferred embodiment of the present invention, the binder is a polyvinyl ether. Suitable monomers are for example methyl vinyl ether, ethyl vinyl ether, propyl vinyl ether, isopropyl vinyl ether, butyl vinyl ether, isobutyl vinyl ether, hexyl vinyl ether, octyl vinyl ether, decyl vinyl ether, dodecyl vinyl ether, 2-ethylhexyl vinyl ether, cyclohexyl vinyl ether, benzyl vinyl ether, trifluoromethyl vinyl ether, hexafluoropropyl vinyl ether or tetrafluoropropyl vinyl ether. The polyvinyl ethers used can be for example homopolymers or copolymers, in particular block copolymers. The copolymers can consist of various monomeric vinyl ethers or be copolymers of vinyl ether monomers with other monomers. Polyvinyl ethers are particularly useful as binders since they have very good adhering and bonding properties.

In a preferred embodiment of the present invention, the binder is a fluorinated or halogenated polymer. This polymer may be formed for example from vinylidene fluoride (VDF), hexafluoropropylene (HFP) or chlorotrifluoroethylene (CTFE), or contain units derived from such monomers. The polymers in question can be for example homopolymers or copolymers, in particular block copolymers. The copolymers can consist of various halogenated monomers or be copolymers of halogenated monomers with other monomers. The polymers and monomers may be fully fluorinated or chlorinated or partially fluorinated or chlorinated. In a particular embodiment of the present invention, the proportion of the entire polymer which is attributable to the halogenated monomers, particularly HFP and CTFE, as comonomers is between 1% to 25% by weight. Halogenated polymers are generally notable for high thermal stability and chemical resistance and also for good wettability. They are particularly useful as binders when wholly or partially fluorinated particles are used for filling the fibrous nonwoven web. The use of copolymers makes it possible to vary the thermalstability and the processing temperature over a wide temperature range. This makes it possible to conform the processing temperature of the binder to the melting temperature of the particles.

In a further embodiment of the present invention, the binder is a polyvinyl compound. Suitable binders are in particular those which consist of N-vinylamide monomers such as V-vinylformamide and N-vinylacetamide or contain these monomers. Suitable are in particular the corresponding homopolymers and copolymers, such as block copolymers. The poly-N-vinyl compounds are notable for good wettability.

In a preferred embodiment of the present invention, the binder is a rubber. Generally known rubbers can be used, such as ethylene-propylene-diene monomer (EPDM) rubber. EPDM rubber in particular has high elasticity and good chemical resistance to polar organic media in particular, and can be used over a wide temperature range. It is also possible to use rubbers selected from natural rubber, isoprene rubber, butadiene rubber, chloroprene rubber, styrene-butadiene rubber or nitrile-butadiene rubber. These rubbers contain unsaturated double bonds and are referred to as R-rubbers. They are notable for a good adhering effect. It is possible to use for example homopolymers or copolymers, in particular block copolymers.

It is also possible to use fluorinated rubbers, such as perfluorocarbon rubber (FFKM), fluorocarbon rubber (FKM) or propylene-tetrafluoroethylene rubber (FPM), and also copolymers thereof. FFKM is particularly preferred. These binders, in particular FFKM, are notable for a high use temperature range, very good resistance to media and chemicals, and very low swelling. They are therefore particularly useful for applications in an aggressive environment at high temperatures, as in fuel cells.

In a preferred embodiment of the present invention, the binder is a polyester or polyamide or a copolymer thereof. The copolymers can consist of various polyamide and/or polyester monomers or be copolymers of such monomers with other monomers. Such binders are notable for very good bonding properties.

The binder can also contain silicon-containing and/or organosilicon polymers. One embodiment utilizes siloxanes as binders. A further embodiment utilizes silyl compounds and/or silanes as binders. These binders, in particular silyl compounds and/or silanes, are preferably used when the particles (3) are wholly or at least partly organic particles.

The melting point of the binder and/or of the particles could be below the melting points of the fibers of the fibrous nonwoven web fabric. By choosing such a binder/particles it is possible for the ply to realize a shutdown mechanism. In a shutdown mechanism, the melting particles and/or the binder blind the pores of the fibrous nonwoven web fabric, so that no dendritic growths through the pores and hence short circuits can occur.

It is conceivable against this background to use mixtures of particles having different melting points. This can be used to achieve stepwise or stagewise blinding of the pores with increasing temperature.

The particles could have an average diameter in the range from 0.01 to 10 µm. The selection of the average diameter from this range will be found particularly advantageous to avoid short circuits through formation of dendritic growths or debris.

The particles could consist of organic polymers. Suitable polymers are for example polyacetals, polycycloolefin copolymers, polyesters, polyimides, polyether ketones, polycarboxylic acids, polycarboxylates, rubbers and halogenated polymers.

The organic polymers can be homopolymers or copolymers. Suitable copolymers are for example random copolymers, gradient copolymers, alternating copolymers, block copolymers or graft polymers. The copolymers can consist of two, three or more different monomers (terpolymers, tetrapolymers). The materials mentioned can also be processed in the form of mixtures to form particles. In general, thermoplastic polymers and polymer mixtures can be used, or crosslinked polymers and polymer mixtures, such as elastomers and thermosets.

The particles can be fabricated in particular from polypropylene, polyvinylpyrrolidone, polyvinylidene fluoride, polyester, polytetrafluoroethylene (PTFE), perfluoroethylene-propylene (FEP), polystyrene, styrene-butadiene copolymers, polyacrylates or nitrile-butadiene polymers and also copolymers of the aforementioned polymers. Particular preference is given to homopolymers, copolymers or block copolymers of vinylidene fluoride (VDF), of polytetrafluoroethylene (PTFE) and of polyoxymethylene (POM, also known as polyacetal or polyformaldehyde).

In a preferred embodiment of the present invention, the particles consist of polyacetals, such as polyoxymethylene (POM), or the particles contain polyacetals. It is also possible to use copolymers of acetals, for example with trioxane as comonomer. Polyacetals are notable for excellent dimensional and thermal stability. They also have only minimal water imbibition. This is advantageous according to the present invention since the filled fibrous nonwoven web fabric will then as a whole imbibe only little water.

In a further embodiment of the present invention, the particles consist of cyclo-olefin copolymers (COCs) or contain these. The thermal properties of COCs can be specifically varied between wide limits by changing the incorporation ratios of cyclic and linear olefins, and hence be conformed to the desired use sectors. Essentially, the heat resistance can thereby be set in a range from 65 to 175° C. COCs are notable for an extremely low water imbibition and very good electrical insulating properties.

In a further embodiment of the present invention, the particles consist of polyesters or contain these. Preference is given to liquid-crystalline polyesters (LCPs) in particular. These are available for example from Ticona under the trade name of Vectra LCP. Liquid-crystalline polyesters are notable for high shape stability, high thermal stability and good chemical resistance.

In a further embodiment of the present invention, the particles consist of polyimides (PIs) or copolymers thereof, or contain these. Suitable copolymers are for example polyether imides (PEIs) and polyamide imides (PAIS). The use of polyimides is advantageous since they have high mechanical strength and high thermal stability. They also exhibit good surface properties, which can be varied specifically from hydrophilic to hydrophobic.

In a further embodiment of the present invention, the particles consist of polyether ketones (PEKs) or copolymers thereof or contain these. Polyether ether ketones (PEEKs) are particularly suitable. Polyether ketones are high temperature resistant and very chemical-resistant.

In a further embodiment of the present invention, the particles consist of polycarboxylic acids or polycarboxylates or copolymers thereof, or they contain these. Suitable are in particular homopolymers and copolymers, in particular block copolymers. The polymers are prepared in particular from methacrylic acid, methacrylates, methacrylamides and methacrylic esters, for example methyl methacrylate, ethyl methacrylate, propyl methacrylate, butyl methacrylate, hexyl methacrylate, 2-ethylhexyl methacrylate, stearyl methacrylate, lauryl methacrylate, cyclohexyl methacrylate, benzyl methacrylate, trifluoromethyl methacrylate, hexafluoropropyl methacrylate, tetrafluoropropyl methacrylate, methyl methacrylamide, ethyl methacrylamide, propyl methacrylamide, butyl methacrylamide, hexyl methacrylamide, 2-ethylhexyl methacrylamide, stearyl methacrylamide, lauryl methacrylamide, cyclohexyl methacrylamide, benzyl methacrylamide, trifluoromethyl methacrylamide, hexafluoropropyl methacrylamide, tetrafluoropropyl methacrylamide, methyl methacrylic acid, ethyl methacrylic acid, propyl methacrylic acid, butyl methacrylic acid, hexyl methacrylic acid, 2-ethylhexyl methacrylic acid, stearyl methacrylic acid, lauryl methacrylic acid, cyclohexyl methacrylic acid, benzyl methacrylic acid, trifluoromethyl methacrylic acid, hexafluoropropyl methacrylic acid and tetrafluoropropyl methacrylic acid. It is also possible to use the corresponding acrylates, acrylamides and acrylic acid compounds. By using these homo- and copolymers it is possible for the desired thermal properties, for example the shutdown of the separator, the adhesion to the fibrous nonwoven web fabric and to the binder and also the wetting properties of the particles to be adjusted in a specific manner.

In a further embodiment of the present invention, the particles consist of rubber or contain a rubber. The rubbers are preferably crosslinked. Generally known rubbers can be used, such as ethylene-propylene-diene monomer (EPDM) rubber. EPDM rubber in particular has high elasticity and good chemical resistance to polar organic media in particular and can be used over a wide temperature range. It is also possible to use for example rubbers selected from natural rubber, isoprene rubber, butadiene rubber, chloroprene rubber, styrene-butadiene rubber and nitrile-butadiene rubber. The polymers of these rubbers contain crosslinkable unsaturated double bonds and are referred to as R-rubbers. These rubbers are preferably crosslinked. They can be used for example as homopolymers or copolymers, in particular block copolymers.

It is also possible to use fluorinated rubbers, such as perfluorocarbon rubber (FFKM), fluorocarbon rubber (FKM) or propylene-tetrafluoroethylene rubber (FPM), and also copolymers thereof. FFKM is particularly preferred. These binders, in particular FFKM, are notable for a high use temperature range, very good resistance to media and chemicals, and very low swelling. They are therefore particularly useful for applications in an aggressive environment at high temperatures, as in fuel cells.

In a preferred embodiment of the present invention, the particles consist of or contain a fluorinated or halogenated polymer. This polymer may be formed for example from vinylidene fluoride (VDF), polytetrafluoroethylene (PTFE), hexafluoropropylene (HFP) or chlortrifluoroethylene (CTFE). The polymers in question can be for example homopolymers or copolymers, in particular block copolymers. The copolymers can consist of various halogenated monomers or be copolymers of halogenated monomers with other monomers. The polymers and monomers may be fully fluorinated or chlorinated or partially fluorinated or chlorinated. In a particular embodiment of the present invention, the proportion of the entire polymer which is attributable to the halogenated monomers, particularly HFP and CTFE, as comonomers is between 1% to 25% by weight. Halogenated polymers are notable for high thermal stability and chemical resistance and also for good wettability. They are particularly useful when wholly or partially fluorinated binders are used. The use and selection of copolymers makes it possible to vary the thermalstability and the processing temperature over a wide temperature range. This makes it possible to conform the processing temperature of the binder to the melting temperature of the particles. It is also made possible to set a shutdown temperature.

Particular preference is given to the use of a copolymer of PTFE and perfluoro-3,6-dioxa-4-methyl-7-octenesulfonic acid (PFSA). This copolymer is available from DuPont under the trade name Nafion. It is advantageous according to the present invention since it has good cation and proton conductivity.

The use of organic polymers for the particles permits unproblematic melting of the particles to obtain a shutdown effect. It is further possible to fabricate a ply which is easy to cut to size without crumbling. Crumbling of the ply will usually occur when there is a relatively high proportion of inorganic particles in the ply. It is conceivable against this background to use mixtures of different particles or core-shell particles. This can be used to achieve stepwise or stagewise blinding of the pores with increasing temperature.

The binders and particles useful according to the present invention, particularly the organic particles, preferably have high thermal stability. More preferably, the binders and/or particles are stable at temperatures of 100, 150, 175 or 200° C. This permits use in fuel cells.

It is also possible to use inorganic particles or inorganic-organic hybrid particles. These particles do not melt below a temperature of 400° C. It is further possible to choose these particles with basic properties in order that the proton activity present in batteries may be at least partially reduced.

Useful inorganic particles include for example metal oxides, metal hydroxides and silicates. These can consist of aluminum oxides, silicon oxides, zeolites, titanates and/or perovskites, or contain these. It is also possible to use mixtures of these particles or mixtures with other materials.

One embodiment of the present invention utilizes inorganic particles in admixture with organic particles. The inorganic particles may intrinsically have a fissured or porous structure and thus raise the porosity, in particular of particle mixtures. They also have high thermal stability, high chemical resistance and good wettability. Mixtures of organic and inorganic particles wherein up to 2%, 5%, 10%, 25% or 50% by weight of the particles (3) are inorganic particles can be used for example.

It is also possible to use inorganic particles which are spherical or whose outer shape comprises a uniform arrangement of faces which approximates a sphere. Such particles are obtainable by crystallization for example.

The fibrous nonwoven web fabric of the present invention is also obtainable without inorganic particles, in contrast to known fibrous nonwoven web fabrics. In one embodiment of the present invention, there are no inorganic particles or particles having inorganic constituents.

The particles which can be used according to the present invention are obtainable by following known methods. Methods are known wherein suitable, in particular spherical, particles are obtained as reaction product of the polymerization. Emulsion or dispersion polymerization are preferred methods.

In a further embodiment, the particles are obtained by further processing of polymers. For example, polymer pellets can be ground. This is followed, if desired, by the use of methods of separation, such as sieving, to obtain the desired size distribution. The particles can consist of mixtures of different sizes of particle. This makes it possible to vary the porosity and pore size distribution.

The fibers of the fibrous nonwoven web fabric could be fabricated from organic polymers, in particular from polybutyl terephthalate, polyethylene terephthalate, polyacrylonitrile, polyvinylidene fluoride, polyether ether ketones, polyethylene naphthalate, polysulfones, polyimide, polyester, polypropylene, polyoxymethylene, polyamide or polyvinylpyrrolidone. It is also conceivable to use bicomponent fibers which include the aforementioned polymers. The use of these organic polymers makes it possible to produce a ply having only minimal thermal shrinkage. Furthermore, these materials are substantially electrochemically stable to the electrolytes and gases used in batteries and capacitors.

The average length of the fibers of the fibrous nonwoven web fabric could exceed their average diameter by at least a factor of two or more, preferably by a multiple. This concrete development makes it possible to fabricate a particularly strong fibrous nonwoven web fabric, since the fibers can become intertwined with each other.

At least 90% of the fibers of the fibrous nonwoven web fabric could have an average diameter of not more than 12 µm. This concrete development makes it possible to construct a ply having relatively small pore sizes for the first pores. Still finer porosity is obtainable when at least 40% of the fibers of the fibrous nonwoven web fabric have an average diameter of not more than 8 µm.

The ply could be characterized by a thickness of not more than 100 µm. A ply of this thickness can still be rolled up without problems and permits very safe battery operation. The thickness could preferably be not more than 60 µm. This thickness permits improved rollability and yet a safe battery operation. The thickness could more preferably be not more than 25 µm. Plies having such a thickness can be used to build very compact batteries and capacitors. In further embodiments, the thickness is at least 3, 5 or 10 µm, in particular between 5 and 100 or between 10 and 60 µm.

The ply could have a porosity of at least 25%. A ply of this porosity is by virtue of its density of material particularly effective in suppressing the formation of short circuits. The ply could preferably have a porosity of at least 35%. A ply of this porosity can be used to produce a battery of high power density. The ply described herein combines very high porosity with nonetheless very small second pores, so that no dendritic growths extending from one side to the other side of the ply can form. It is conceivable against this background that the second pores form a labyrinthine microstructure in which no dendritic growths from one side to the other side of the ply can form. In a further embodiment, the porosity is between 25% and 70%, in particular between 35% and 60%.

The ply could have pore sizes of not more than 3 µm. The choice of this pore size will be found particularly advantageous in avoiding short circuits. The pore sizes could more preferably be not more than 1 µm. Such a ply is particularly advantageous in avoiding short circuits due to metal dendrite growth, due to debris from electrode particles and due to direct contact between the electrodes on pressure application.

The ply could have an ultimate tensile strength force in the longitudinal direction of at least 15 newtons/5 cm. A ply of this strength is particularly easy to roll up on the electrodes of a battery without rupturing.

The basis weight of the ply of the present invention could be between 10 and 60 and in particular between 15 and 50 g/m².

The present invention also provides a process for producing a ply of the present invention. In this process, the first step is to produce a solution or dispersion of the particles (3) and optionally of a binder. The fibers (1) of the fibrous nonwoven web fabric are coated with the dispersion. Subsequently, the coated fibrous nonwoven web fabric is optionally dried and/or heated.

In a preferred embodiment of the present invention, the first step is to produce a dispersion. This dispersion contains the binder, the particles and optionally further additives.

The additives can be selected such that they influence the rheology and hence the processing and/or the stability of the dispersion. It is possible to use customary dispersion additives such as acids, bases, surfactants, for example ionic or nonionic surfactants, polymers, such as polyacrylates, oligoethers, polyethers and polyelectrolytes. The particles used can form a dispersion in their as-produced state, or they are made available by the manufacturer in the form of a dispersion. If necessary, they first have to be dispersed. Common dispersing assistants, such as surfactants and emulsifiers, can be used.

To produce the dispersion, the components are added together and homogenized by stirring with or without heating. The dispersion is preferably an aqueous dispersion. However, it is also possible to use a dispersion in a solvent or in a water-solvent mixture. The solids content of the dispersion is preferably between 5% to 70%, preferably 20% to 65% and more preferably 25% and 55% by weight.

The dispersion can be applied to the fibrous nonwoven web fabric by following known coating processes. In particular embodiments, a fibrous nonwoven web fabric is coated, preferably continuously or else semi-continuously, using common coating processes. Suitable processes are for example blade coating, spraying, roll coating, curtain coating, roller systems, for example 2, 3 & 5 roller systems, 3 roller combi systems, micro roller systems, reverse roll systems, engraved roller systems, dipping systems, slot die systems, knife systems, double side systems, comma bar systems, foam application, or preferably impregnating. The coating speed can be 0.5 to 1000 or 0.5 to 200 m/min, preferably 20 to 200 or 20 to 1000 m/min, and more preferably between 50 and 200 or 50 to 100 m/min. Subsequently, the coated fibrous nonwoven web fabric is preferably dried and optionally consolidated. The coating can be dried at 50 to 500° C. or 50 to 200° C., preferably 100 to 200° C. and more preferably between 120 and 200° C. The heating and/or the drying is performable not only under contact (calendering, drum dryer) but also contactlessly (warm air, hot air, IR radiation, microwaves) or by other heating methods according to the prior art.

The ply could be mechanically consolidated by calendering. Calendering is effective in reducing surface roughness. The particles used at the surface of the fibrous nonwoven web fabric exhibit flattening after calendering.

The ply described herein can be used as a separator in batteries and capacitors in particular, since it is particularly efficacious in preventing short circuits.

The ply described herein can also be used as a gas diffusion layer or membrane in fuel cells, since it exhibits good wetting properties and can transport liquids.

There are, then, various ways of advantageously developing and refining the teaching of the present invention. Reference must be made, on the one hand, to the subordinate claims and, on the other, to the following elucidation of a preferred illustrative embodiment of the present invention with reference to the drawing.

The elucidation of the preferred illustrative embodiment of the present invention with reference to the drawing will also serve to elucidate generally preferred developments and refinements of the teaching.

DETAILED DESCRIPTION

Methods of Measurement

Figure 1:
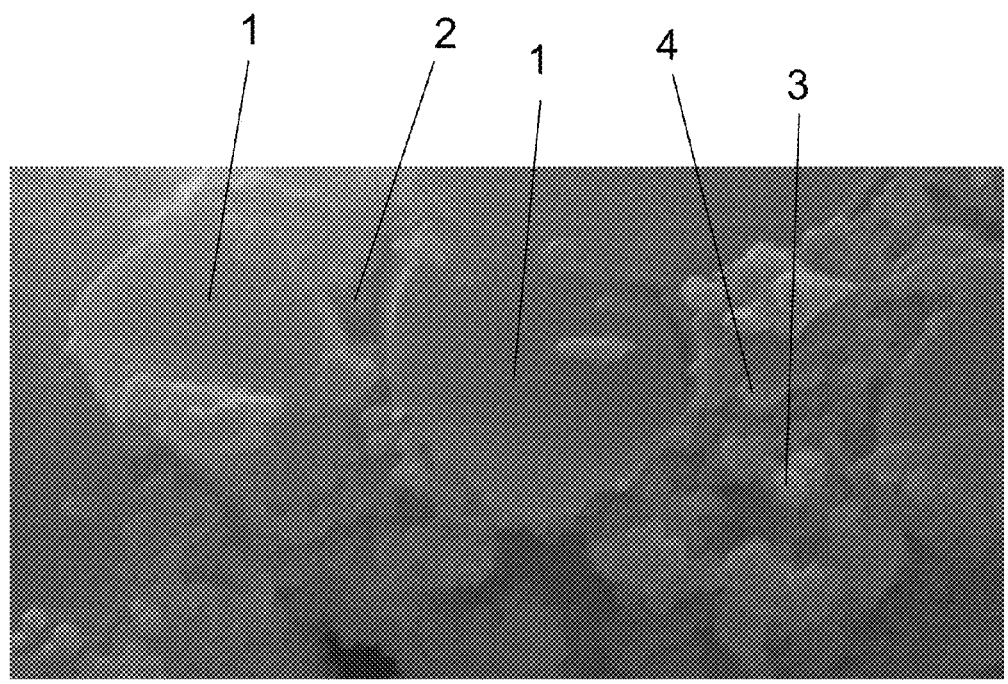
FIG. 1 shows a scanning electron micrograph of a ply in which the particles are present in first pores in a fibrous nonwoven web fabric and form a porous region filled with particles.

The illustrative embodiments utilized the following methods of measurement:

The average pore size was determined by following ASTM E 1294 (Test Method for Pore Size Characteristics of Membrane Filters Using Automated Liquid Porosimeter).

Basis weight was determined by die-cutting out in each case 3 100 by 100 mm size samples, weighing the samples and multiplying the measured value by 100.

Thicknesses were measured using an Electric model 2000 U precision thickness meter. The area measured was 2 cm$^2$, the measurement pressure was 1000 cN/cm$^2$.

Porosity was determined from the thicknesses, the weight and the densities of the materials used.

To determine shrinkage, 100×100 mm size specimens were die-cut and stored for 10 minutes at 120° C. in a Mathis Labdryer. Subsequently, the shrinkage of the specimens was determined.

Example 1

To 200 parts of a 60% PTFE dispersion (Dyneon TF 5032R, from 3M, average particle size 160 nm) was added with constant stirring 50 parts of a CMC (carboxymethylcellulose) solution. This was followed by the addition, again with stirring, of 13.3 parts of a 40% SBR (styrene-butadiene rubber) dispersion and 50 parts of deionized water. The solution was stirred for 2 hours and stability tested for at least 24 hours. The viscosity of the solution obtained was 200 cP at a pH of 9.5.

Coating

A 30 by 49.5 cm size PET fibrous nonwoven web fabric (thickness: 20 μm, basis weight: 11.6 g/m$^2$) was drenched with the above solution, led through a system of press rolls (speed about 1 m/min, 0.7 bar pressure) and dried at 120° C. An impregnated fibrous nonwoven web fabric having a basis weight of 23 g/m$^2$ and a thickness of 27 μm was obtained. The computed porosity was 50.3%.

Example 2

To 200 parts of a 60% PTFE dispersion (Dyneon TF 5032R, from 3M, average particle size 160 nm) was added with constant stirring 100 parts of a 1% CMC (carboxymethylcellulose) solution. This was followed by the addition, again with stirring, of 10 parts of an aqueous SBR (styrene-butadiene rubber) dispersion (40% solids content, particle size 120 nm). The solution was stirred for 2 hours and stability tested for at least 24 hours. The viscosity of the solution obtained was 17 000 cP at a pH of 9.8.

Coating

A 30 by 49.5 cm size PET fibrous nonwoven web fabric (thickness: 20 μm, basis weight: 11.3 g/m$^2$) was blade coated with the above paste and dried at 60° C. and then at 120° C. An impregnated fibrous nonwoven web fabric having a basis weight of 30 g/m$^2$ and a thickness of 32 μm was obtained. The computed porosity was 42.1%.

Example 3

To 200 parts of a 60% PTFE dispersion (Dyneon TF 5032R, from 3M, average particle size 160 nm) was added with constant stirring 180 parts of a 1% CMC (carboxymethylcellulose) solution. This was followed by the addition, again with stirring, of 50 parts of a 59% PVDF (polyvinylidene fluoride) dispersion (KYNAR 301F, from Arkema, average particle size 0.25 μm). The solution was stirred for 2 hours and stability tested for at least 24 hours. The viscosity of the solution obtained was 350 cP and had a pH of 9.9.

Coating

A 15 cm wide PET fibrous nonwoven web fabric (thickness: 20 μm, basis weight: 11.3 g/m$^2$) was continuously roll-coated and dried at 120° C.

An impregnated fibrous nonwoven web fabric having a basis weight of 40 g/m$^2$ and a thickness of 42 μm was obtained. The computed porosity was 47%.

Example 4

To 200 parts of a 57% PVDF dispersion (KYNAR 301F, from Arkema, average particle size 0.25 μm) were added with continuous stirring using a blade stirrer 200 parts of a 2% PVP (polyvinylpyrrolidone) solution (Luvitec K90, from BASF). The solution was stirred for 2 hours and stability tested for at least 24 hours. The viscosity of the solution obtained was 150 cP and had a pH of 7.1.

Coating

A 15 cm wide PET fibrous nonwoven web fabric (thickness: 20 μm, basis weight: 11.3 g/m$^2$) was continuously roll-coated and dried at 120° C.

An impregnated fibrous nonwoven web fabric having a basis weight of 26.5 g/m$^2$ and a thickness of 30 μm was obtained. The average pore size was 0.18 μm and the computed porosity was 44%.

Example 5

To 180 parts of a 1% CMC (carboxymethylcellulose) solution were added 150 parts of a 60% aluminum oxide dispersion (Al2O3) (average particle size 0.7 μm) and stirred for 30 minutes. This was followed by the addition, again with stirring, of 35 parts of a 59% PVDF (polyvinylidene fluoride) dispersion (KYNAR 301F, from Arkema, average particle size 0.25 μm). The solution was stirred for 2 hours and stability tested for at least 24 hours. The viscosity of the solution obtained was 150 cP and had a pH of 9.9.

Coating

A 15 cm wide PET fibrous nonwoven web fabric (thickness: 20 μm, basis weight: 11.3 g/m$^2$) was continuously roll-coated with the above solution and dried at 120° C.

An impregnated fibrous nonwoven web fabric having a basis weight of 26.6 g/m$^2$ and a thickness of 34 μm was obtained. The average pore size was 0.22 μm and the computed porosity was 69%.

Example 6

To 50 parts of a 16.7% PVP solution (Luvitec K90, from BASF) were added with constant stirring 62 parts of PVDF powder (polyvinylidene fluoride, KYNAR 301F, from Arkema, average particle size 0.25 μm) and 87 parts of deionized water. The batch was vigorously stirred for 4 hours and stability tested for at least 24 hours. The viscosity of the coating paste obtained was 3000 cP.

Coating

A 21 cm by 29.7 cm size PET fibrous nonwoven web fabric (thickness: 12 μm, basis weight: 9.2 g/m²) was coated by means of a laboratory blade coater (speed 20 m/min) and dried at 120° C.

An impregnated fibrous nonwoven web fabric having a basis weight of 17 g/m² and a thickness of 25 μm was obtained. The computed porosity was 53%.

Example 7

To 50 parts of a 16.7% PVP solution (K90) were added with continuous stirring 13 parts of PVDF powder (polyvinylidene fluoride, KYNAR 301F, from Arkema, average particle size 0.25 μm) and 4 parts of K30 PVP (Luvitec K30, from BASF). The batch was vigorously stirred for 4 hours and stability tested for at least 24 hours.

Coating

A 21 cm by 29.7 cm size PET fibrous nonwoven web fabric (thickness: 12 μm, basis weight: 9.2 g/m²) was drenched with the above solution, led through a system of press rolls (pressure: 1 bar), dried at 120° C. and then calendered at 160° C.

An impregnated fibrous nonwoven web fabric having a basis weight of 24 g/m² and a thickness of 26 μm was obtained. The computed porosity was 42% and the average pore size was 0.19 μm.

TABLE 1

Overview of Examples 1 to 7

| Specimen | Method | Thickness [μm] | Weight [g/m²] | Shrinkage [% after 10 min @ 120° C.] | Porosity [%] | Average pore size [μm] |
|---|---|---|---|---|---|---|
| Ex. 1 | Impregnating | 27 | 23 | | 50.3 | |
| Ex. 2 | Blade coating | 32 | 30 | | 42.1 | |
| Ex. 3 | Roll coating | 42 | 40 | | 47 | |
| Ex. 4 | Roll coating | 30 | 26.5 | 1.3 | 44 | 0.18 μm |
| Ex. 5 | Roll coating | 34 | 26.6 | 0 | 69 | 0.22 μm |
| Ex. 6 | Blade coating | 25 | 17 | | 53 | |
| Ex. 7 | Impregnating | 26 | 24 | 1.2 | 42 | 0.19 μm |

Example 8

FIG. 1 shows a ply having a foundational structure composed of a fibrous nonwoven web fabric, the foundational structure consisting of fibers 1 and having first pores 2 formed by the fibers 1, the foundational structure being at least partially filled with particles 3, which particles 3 at least partially fill the first pores 2 and form regions 4 filled with particles 3.

Figure 3:
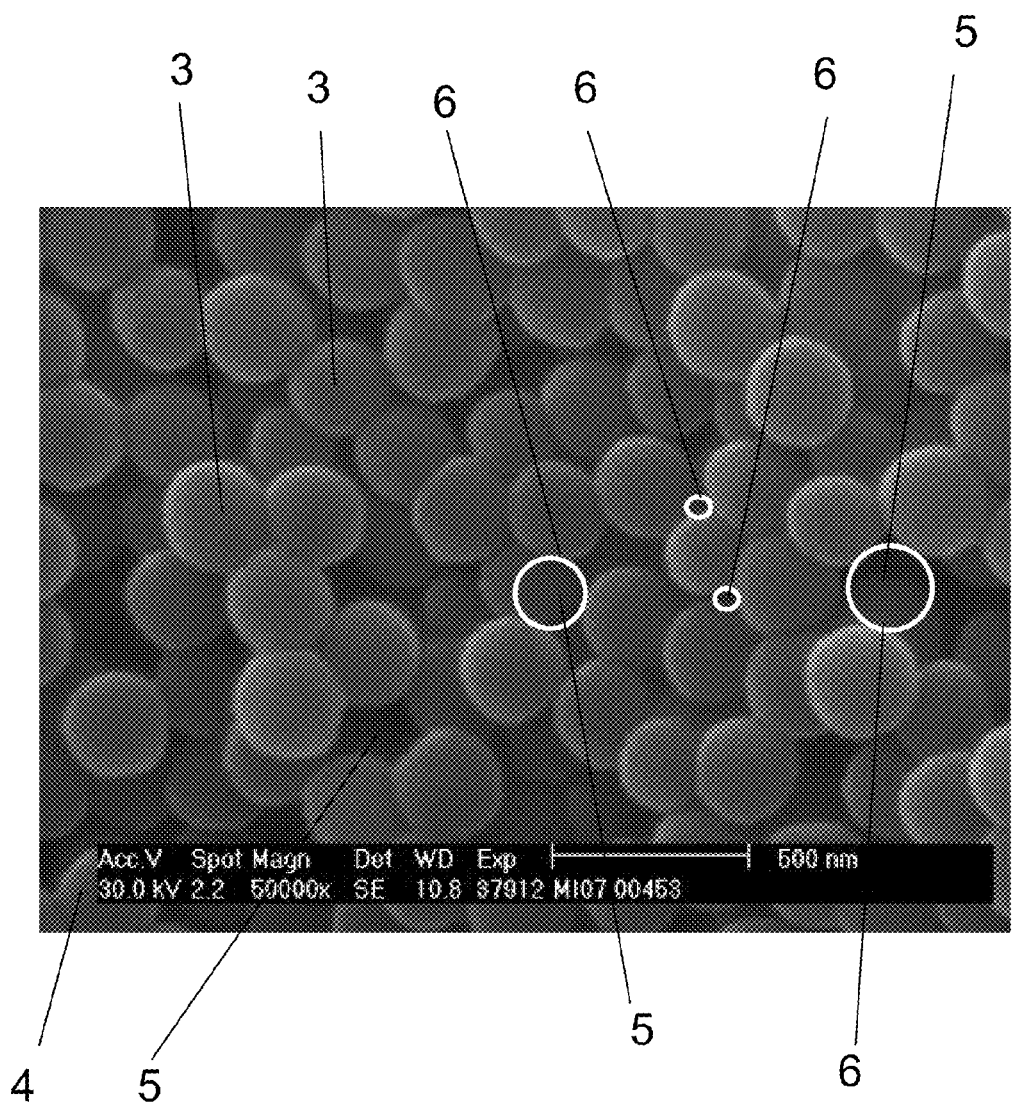
FIG. 3 shows a greatly magnified scanning electron micrograph of the particles of a filled region.

FIG. 3 shows a filled region 4 in a magnified view. With reference to FIG. 3, the particles 3 form second pores 5 in the filled regions 4, the average diameter of the particles 3 being greater than the average pore size of the majority of the second pores 5. The particles 3 are spherical and tend to form a closest packing of spheres in regions.

Figure 2:
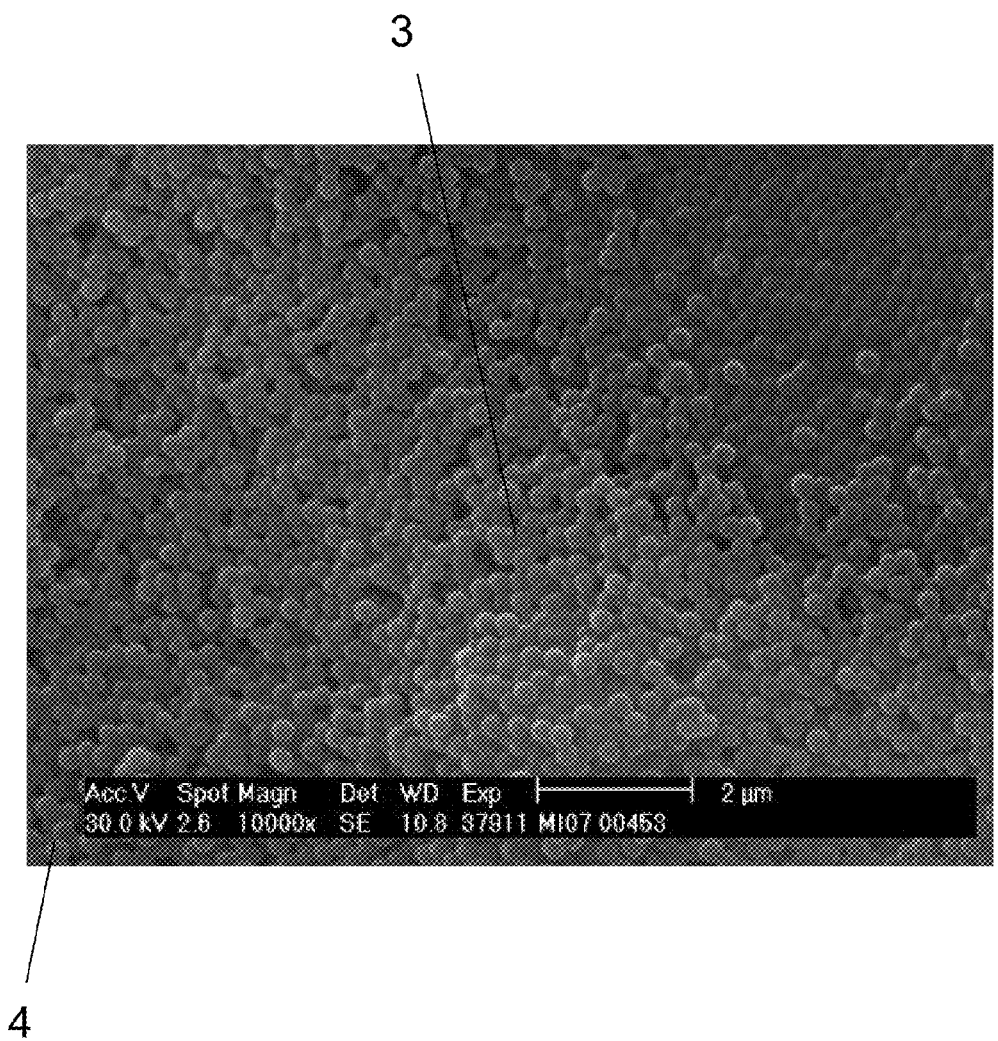
FIG. 2 shows a scanning electron micrograph of the particles of a filled region configured as a coating.

FIG. 2 shows a coating of the particles 3 which has been applied to the fibrous nonwoven web fabric.

FIGS. 1 to 3 show scanning electron micrographs of a ply comprising a fibrous nonwoven web fabric, the fibers 1 of which are fabricated from polyester. The particles 3 are spherical in configuration and form in regions agglomerates which fill the first pores 2 in the fibrous nonwoven web fabric. The fibers 1 have an average diameter of less than 12 μm. The ply has a thickness of 25 μm. It exhibits a shrinkage in the transverse direction of less than 1% at a temperature of 170° C.

The average diameter of the particles 3 is 200 nm. The particles 3 consist of polyvinylidene fluoride and were secured to the fibers 1 by a polyvinylpyrrolidone binder.

The average diameter of the particles 3 is determined from the number of particles 3 in the filled region 4. The particles 3 preferably exhibit a narrow distribution curve; that is, an average diameter having a low standard deviation. The average pore sizes of most, viz. the majority, of the second pores 5 is less than 200 nm. By average pore size of a second pore 5 is meant the diameter of an imaginative sphere 6 which has the same volume as the pore 5. The imaginative sphere resides between the particles 3 such that it touches the surfaces of the neighboring particles 3. Imaginative spheres 6 which characterize the dimension of the pores are depicted in FIG. 3 as black-bordered hollow circles.

A distribution curve where the x-axis indicates the average pore sizes of the second pores 5 and the y-axis indicates the number or frequency of the average pore sizes would show that more than 50% of the second pores 5 have average pore sizes which are below 200 nm.

With regard to further advantageous developments and refinements of the teaching of the present invention reference is made to the general part of the description and to the accompanying claims.

It may finally be emphasized most particularly that the previously purely arbitrarily selected illustrative embodiment merely serves to discuss the teaching of the present invention, but does not limit that teaching to this illustrative embodiment.

The invention claimed is:

1. A separator configured for a battery or a capacitor, the separator comprising:
    a fibrous nonwoven web fabric forming a foundational structure; and
    a binder, which is applied as an aqueous dispersion,
    wherein the foundational structure includes fibers forming first pores and is at least partially filled with inorganic particles,
    wherein the inorganic particles at least partially fill the first pores so as to form regions filled with particles,
    wherein the inorganic particles in the filled regions form second pores,
    wherein the first and second pores form a labyrinthine microstructure in which dendritic interpenetration from one side to another of the layer cannot take place, and
    wherein an average diameter of the inorganic particles is greater than an average pore size of the second pores.

2. The separator as recited in claim 1, wherein the inorganic particles are spherical.

3. The separator as recited in claim 1, wherein the inorganic particles form a homogeneously distributed sheet in the foundational structure.

4. The separator as recited in claim 1, wherein at least a portion of the filled regions forms a coating of the foundational structure.

5. The separator as recited in claim 1, wherein the inorganic particles are united with the fibrous nonwoven web fabric via the binder,
    wherein the binder comprises a polyester, polyamide, polyether, polycarboxylate, polycarboxylic acid, polyvinyl compound, polyolefin, rubber, halogenated polymer, unsaturated polymer, a copolymer thereof, or a mixture of two or more of any of these.

6. The separator as recited in claim 1, wherein the inorganic particles are united with the fibrous nonwoven web fabric via the binder,
wherein the binder comprises a polyvinylpyrrolidone, polyacrylic acid, polyacrylate, polymethacrylic acid, polymethacrylate, polystyrene, polyvinyl alcohol, polyvinyl acetate, polyacrylamide, cellulose, a derivative of cellulose, polyether, phenolic resin, melamine resin, polyurethane, nitrile rubber (NBR), styrene-butadiene rubber (SBR), latex, fluorinated polymer, chlorinated polymer, siloxane, silyl compound, silane, a copolymer thereof, or a mixture of two or more of any of these.

7. The separator as recited in claim 1, wherein a melting point of the binder is below a melting point of at least one of the inorganic particles and the fibers.

8. The separator as recited in claim 1, wherein the inorganic particles have an average diameter between 0.01 and 10 µm.

9. The separator as recited in claim 1, wherein the inorganic particles comprise a metal oxide, metal hydroxide, silicate, or a mixture of two or more thereof.

10. The separator as recited in claim 1, wherein the fibers comprise polybutylene terephthalate, polyethylene terephthalate, polyacrylonitrile, polyvinylidene fluoride, polyether ether ketone, polyethylene naphthalate, polysulfone, polyimide, polyester, polypropylene, polyoxymethylene, polyamide, polyvinylidene fluoride, polyvinylpyrrolidone, or a mixture thereof.

11. The separator as recited in claim 1, wherein an average length of the fibers exceeds their average diameter by at least a factor of two.

12. The separator as recited in claim 1, wherein at least 90% of the fibers have an average diameter of not more than 12 µm.

13. The separator as recited in claim 1, wherein at least 40% of the fibers have an average diameter of not more than 8 µm.

14. The separator as recited in claim 1, having a thickness of not more than 100 µm.

15. The separator as recited in claim 1, having a porosity of at least 25%.

16. The separator as recited in claim 1, wherein the first and second pores each have a pore size of not more than 3 µm.

17. The separator as recited in claim 1, wherein an ultimate tensile strength force of the ply is at least 15 N/5 cm in a longitudinal direction.

18. The separator as recited in claim 1, wherein the foundational structure is calendered.

19. A method for producing the separator as recited in claim 1, the method comprising:
dispersing the particles so as to form a dispersion; and
coating the fibers with the dispersion.

20. The separator as recited in claim 1, wherein the binder comprises a thermoset.

21. The separator as recited in claim 1, wherein the binder comprises a non-thermoplastic elastomer.

22. The separator as recited in claim 1, having a porosity between 25% and 70%.

23. The separator as recited in claim 1, having a porosity between 25% and 47%.

24. The separator as recited in claim 1, having a porosity between 50.3% and 75%.

* * * * *